(12) United States Patent
Micallef et al.

(10) Patent No.: US 9,943,830 B2
(45) Date of Patent: Apr. 17, 2018

(54) TUNGSTEN/TITANIA OXIDATION CATALYST

(71) Applicant: Johnson Matthey Public Limited Company, London (GB)

(72) Inventors: David Micallef, Lower Cambourne (GB); Alex Parsons, Barkway (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/341,890

(22) Filed: Jul. 28, 2014

(65) Prior Publication Data

US 2015/0031526 A1    Jan. 29, 2015

Related U.S. Application Data

(60) Provisional application No. 61/858,913, filed on Jul. 26, 2013.

(51) Int. Cl.
| | |
|---|---|
| *B01J 21/20* | (2006.01) |
| *B01J 23/54* | (2006.01) |
| *B01D 53/94* | (2006.01) |
| *B01J 38/02* | (2006.01) |
| *B01J 23/02* | (2006.01) |
| *B01J 35/00* | (2006.01) |
| *B01J 23/38* | (2006.01) |
| *B01J 21/06* | (2006.01) |
| *B01J 23/42* | (2006.01) |
| *B01J 23/44* | (2006.01) |
| *B01J 23/46* | (2006.01) |
| *B01J 23/96* | (2006.01) |

(52) U.S. Cl.
CPC .......... *B01J 23/54* (2013.01); *B01D 53/9436* (2013.01); *B01D 53/9468* (2013.01); *B01J 21/063* (2013.01); *B01J 23/38* (2013.01); *B01J 23/42* (2013.01); *B01J 23/44* (2013.01); *B01J 23/464* (2013.01); *B01J 23/96* (2013.01); *B01J 35/0006* (2013.01); *B01J 38/02* (2013.01); *B01D 53/9418* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/20707* (2013.01); *B01D 2255/20776* (2013.01); *B01D 2257/406* (2013.01); *B01D 2258/01* (2013.01)

(58) Field of Classification Search
CPC . B01J 21/20; B01J 23/54; B01J 21/063; B01J 223/38; B01J 23/42; B01J 23/44; B01J 23/464; B01J 23/96; B01J 35/0006; B01J 38/02; B01D 53/9636; B01D 53/9468
See application file for complete search history.

(56) References Cited

U.S. PATENT DOCUMENTS

| 6,641,785 B1 | 11/2003 | Neufert et al. |
| 7,393,511 B2 | 7/2008 | Tran et al. |
| 8,293,182 B2 | 10/2012 | Boorse et al. |
| 2006/0083671 A1 | 4/2006 | Obayashi et al. |

FOREIGN PATENT DOCUMENTS

| CN | 102985655 B | | 3/2013 |
| DE | 102008009672 A1 | | 8/2009 |
| JP | 2011144749 A | * | 7/2011 |
| WO | 99/56872 A2 | | 11/1999 |
| WO | 2013017873 A1 | | 2/2013 |

* cited by examiner

*Primary Examiner* — Melvin C Mayes
*Assistant Examiner* — Michael Forrest

(57) ABSTRACT

A catalyst article for treating an emission gas is provided comprising (a) an oxidation catalyst comprising at least one noble metal on a $WO_3$—$TiO_2$ support, wherein the support contains about 1 to about 20 weight percent $WO_3$ based on the combined weight of the $WO_3$ and $TiO_2$; and (b) a substrate, wherein the first and second catalyst layers are on and/or within the substrate.

20 Claims, 2 Drawing Sheets

TUNGSTEN/TITANIA OXIDATION CATALYST

CROSS REFERENCE TO RELATED APPLICATION

This application claims priority benefit to U.S. application Ser. No. 61/858,913 filed on Jul. 26, 2013, which is incorporated herein by reference.

BACKGROUND

Field of Invention

Provided is an oxidation catalyst for treating combustion exhaust gas, and particularly for reducing ammonia slip associated with a selective catalytic reduction process.

Description of Related Art

Combustion of hydrocarbon fuel produces engine exhaust or flue gas that contains, in large part, relatively benign nitrogen ($N_2$), water vapor ($H_2O$), and carbon dioxide ($CO_2$). But the exhaust gases also contains, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of undesirable components, preferably by a process that, in turn, does not generate other noxious or toxic substances.

$NO_x$, which includes nitric oxide (NO), nitrogen dioxide ($NO_2$), and nitrous oxide ($N_2O$), is a burdensome component to remove from exhaust gas generated by lean burn engines. The reduction of $NO_x$ to $N_2$ is particularly problematic in lean burn exhaust gas because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a nitrogenous reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalyzed substrate. The chemical equation for stoichiometric SCR reactions using ammonia is:

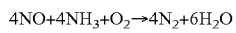

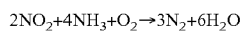

Most SCR processes utilize a stoichiometric excess of ammonia in order to maximize the conversion of $NO_x$. Unreacted ammonia that passes through the SCR process (also referred to as "ammonia slip") is undesirable, because the slipped ammonia gas can react with other combustion species and/or negatively impact the atmosphere if released. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania, alumina, silica, zirconia, etc. However, these catalysts may be susceptible to poisoning by $SO_x$ (e.g., $SO_2$ and/or $SO_3$) that is often present in certain fuel, particularly diesel.

Accordingly, there remains a need in the art for improved ammonia slip catalysts. The present invention satisfies this need among others.

SUMMARY OF THE INVENTION

The present invention, in part, pertains to a heterogeneous oxidation catalyst that is particularly effective at reducing ammonia slip when used downstream of an SCR process. When disposed on a substrate, the catalyst comprises an oxidative component that is resistant to $SO_x$ poisoning. Applicants have surprisingly found that a catalyst of noble metal supported on tungsten/titania is much less susceptible to $SO_x$ poisoning compared to conventional supports such alumina, and even compared to supports typically regarded as be suitable for high SOx applications such as titania and silica-titania. The high $SO_x$ tolerance of the present catalyst is advantageous for applications in which the catalyst is exposed to high $SO_x$ concentrations.

Accordingly, provided is a catalyst article for treating exhaust gas comprising (a) an oxidation catalyst comprising a noble metal on a $WO_3$—$TiO_2$ support, wherein the support contains about 1 to about 20 weight percent $WO_3$ based on the combined weight of the $WO_3$ and $TiO_2$, and (b) a substrate; wherein the oxidation catalyst is disposed on or within the substrate.

According to another aspect of the invention, provided is a method for treating an exhaust gas comprising (a) flowing an exhaust gas containing $NH_3$ through a substrate having an oxidation catalyst comprising a noble metal on a $WO_3$—$TiO_2$ support, wherein the support contains about 1 to about 20 weight percent $WO_3$ based on the combined weight of the $WO_3$ and $TiO_2$, and (b) oxidizing at least a portion of the $NH_3$ to produce $NO_x$ and $H_2O$, particularly where the flowing exhaust gas contains at least 350 ppm $SO_x$ or the oxidation catalyst is exposed to more than 5 g/L of sulfur.

According to yet another aspect of the invention, provided is a method for regenerating an exhaust gas particulate filter comprising (a) flowing an exhaust gas through a substrate having an oxidation catalyst, wherein the exhaust gas contains $SO_x$ prior to entering the substrate, and wherein the oxidation catalyst comprises a noble metal on a $WO_3$—$TiO_2$ support, wherein the support contains about 1 to about 20 weight percent $WO_3$ based on the combined weight of the $WO_3$ and $TiO_2$; (b) absorbing at least a portion of the $SO_x$ in the catalyst layer; and (c) regenerating the catalyst after the catalyst layer adsorbs at least 5 g/L of the $SO_x$.

DETAILED DESCRIPTION OF PREFERRED EMBODIMENTS OF THE INVENTION

Figure 1A:
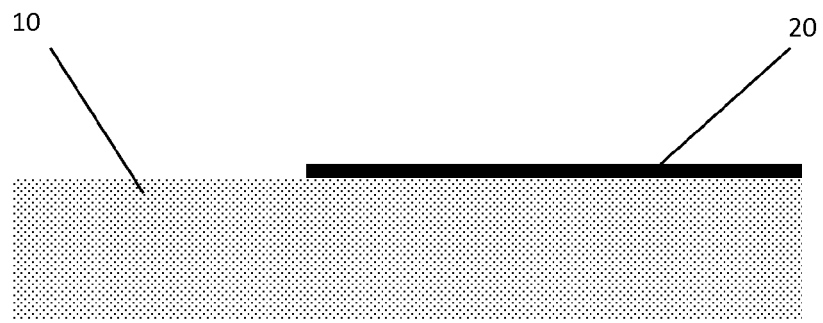
FIGS. 1A-1B are drawings of catalyst articles according to certain embodiments of the present invention.

In a preferred embodiment, the invention is directed to a catalyst article for improving environmental air quality, particularly for improving exhaust gas emissions generated by power plants, gas turbines, lean burn internal combustion engines, and the like. Emissions are improved, at least in part, by reducing the concentrations of $NH_3$ and/or $NO_x$ in the exhaust gas over a broad operational temperature range. In addition, use of the present catalyst can improve fuel economy by requiring less high temperature regenerations per operating hour. Moreover, the catalyst of the present invention can be used with fuel having relatively high sulfur levels, which is generally considered lower quality fuel. Useful catalyst articles include those that preferentially oxidize ammonia and/or reduce $NO_x$ in an oxidative environment, and particularly environments wherein the catalyst is subjected to high concentrations of $SO_x$.

In preferred embodiments, the catalyst article of the present invention comprises an oxidation catalyst containing at least one noble metal on a tungsten/titania support. The noble metal can be one or more of ruthenium, rhenium, rhodium, palladium, silver, osmium, iridium, platinum, and gold. Preferably the noble metal is one or more platinum group metals (PGMs), specifically ruthenium, rhodium, palladium, osminum, iridium, and platinum. In certain embodiments, the noble metal is platinum, palladium, or a combination of the two. The noble metal component can be added to the support by any conventional means, such as mixing an aqueous salt solution containing the metal with the support to form a washcoat which can then be applied to the substrate.

The noble metal on the substrate is preferably present in an amount of about 0.1 to 30 $g/ft^3$ of noble metal, more preferably about 0.5-10 $g/ft^3$, and even more preferably about 1-5 $g/ft^3$. Preferably, the oxidation catalyst contain about 0.05 to about 5 weight percent, more preferably about 0.1 to about 2 weight percent, and even more preferably about 0.5-1 weight percent noble metal based on the weight of the tungstate/titania support. The tungstate/titania support is present on the substrate in an amount of about 0.01 to about 3 $g/in^2$, more preferably about 0.05 to about 1 $g/in^2$, and even more preferably about 0.1 to about 0.5 $g/in^2$.

In certain embodiments, the catalyst is free or essentially free of one or more of ruthenium, rhenium, rhodium, palladium, silver, osmium, iridium, platinum, and/or gold. In certain embodiments, the oxidation catalyst is free or essentially free of rare earth metals. Preferably, the oxidation catalyst is free or essentially free of one or more alkali and alkaline earth metals, such as sodium, potassium, calcium, and magnesium. Preferably, the oxidation catalyst is free or essentially free of vanadium and/or molybdenum. In certain embodiments, the oxidation catalyst is free or essentially free of manganese, silicon, zirconium, aluminum, cerium, and oxides thereof. In certain embodiments, the oxidation catalyst is free or essentially free of one or metals selected from copper, iron, nickel, cobalt, chromium, hafnium, lanthanum, gallium, and zinc. As used herein, the term "essentially free" with respect to a metal in the oxidation catalyst means that the metal is either not present or is present in a concentration low enough so as not to affect the oxidation function of the catalyst. Examples of catalysts essentially free of a specific metal include those in which the specific metal is present in an amount of less than about 1 weight percent, less than about 0.1 weight percent, or less than about 0.01 weight percent, based on the total weight of the noble metal(s) in the catalyst.

It is understood that an oxidation catalyst that is essentially free of a specific metal may be part of a washcoat composition that includes "catalytically inactive" metals or their oxides. A "catalytically inactive" metal it is meant that a metal oxide which does not directly participate as a molecular component in the catalytic reduction of $NO_x$ and/or oxidization of $NH_3$. Examples of catalytically inactive metal oxides include certain refractory metal oxides used as binders, fillers, rheology modifiers, and the like. For example, a washcoat containing an alumina binder may further contain an oxidation catalyst that is essentially free of aluminum.

The tungsten/titania support preferably contains tungsten on titania. Preferably, the tungsten/titania is not a simply a physical mixture of $WO_3$ and $TiO_2$, but instead is a composite oxide, for example titania doped with tungsten. Useful titania includes both the rutile or anatase forms, with the rutile form being more preferred. In certain embodiments, the majority of the titania is of the rutile form. Preferably, the support comprises about 1 to about 20 weight percent, about 2 to 10 weight percent, or about 3 to 7 weight percent $WO_3$, with the balance being $TiO_2$.

In certain embodiments, the support consists of $WO_3$ and $TiO_2$ and does not include any other metals or metal oxides, such as vanadium, silicon, aluminum, molybdenum, cerium, manganese, magnesium, zirconium, rare-earth metals, or their related oxides. Surprisingly, $WO_3/TiO_2$ as a support for a noble metal is more resistant to sulfur poisoning compared to conventional oxide supports such as $TiO_2$ and $SiO_2$, and even compared to mixed oxides such as $SiO_2/TiO_2$. Moreover, the $WO_3/TiO_2$ supports of the present invention have superior tolerance to sulfur poisoning compared to mixed oxides containing both $WO_3$, $TiO_2$, and a third component such as $SiO_2$ (i.e., $SiO_2/WO_3/TiO_2$).

The tungsten/titania support preferably has a pore volume of about 0.1-0.5 g/cc, for example about 0.2-0.4 g/cc, preferably measured by mercury intrusion porosimetry. In certain embodiments, the supports have wide pores (e.g., 100-350 Å) or both wide and narrow pores. In certain embodiments, the support has a BET surface area of at least 50 $m^2/g$, preferably about 50-500 $m^2/g$, more preferably about 50-300 $m^2/g$, or about 150-250 $m^2/g$. The mean particle size, based on the particle count, of the support material is preferably about 0.01-10 μm, for example about 0.5-5 μm, about 0.1-1 μm, or about 5-10 μm, and preferably has a majority of the particle count within one of these ranges. In certain embodiments, the $D_{90}$ particle size of the support is within one of these ranges.

The oxidation catalyst of the present invention can be utilized in a heterogeneous catalytic reaction systems (i.e., solid catalyst in contact with a gas reactant). To improve contact surface area, mechanical stability, and fluid flow characteristics, the oxidation catalyst can be disposed on and/or within a substrate. In certain embodiments, a washcoat containing the oxidation catalyst is applied to an inert substrate, such as corrugated metal plate or a honeycomb cordierite brick. The washcoat comprising the oxidation catalyst is preferably a solution, suspension, or slurry. Suitable coatings include surface coatings that cover a portion or the entire substrate, coating that penetrate a portion of the substrate, coatings that permeate the substrate, or some combination thereof. In addition to the oxidation catalyst, a washcoat can also include components, such as fillers, binders, stabilizers, rheology modifiers, and other additives, including one or more of alumina, silica, non-zeolite silica alumina, titania, zirconia, ceria. In certain embodiments, the washcoat comprises pore-forming agents such as graphite, cellulose, starch, polyacrylate, and polyethylene, and the like. These additional components do not necessarily catalyze the desired reaction, but instead improve the catalytic material's effectiveness, for example by increasing its operating temperature range, increasing contact surface area of the catalyst, increasing adherence of the catalyst to a substrate, etc. Typically, metal oxide particles used as binders are distinguishable over metal oxide particles used as supports based on particle size, with the binder particles being significantly larger relative to support particles.

In certain embodiments, the washcoat loading on or within the substrate is >1.00 g/in$^3$, such as >1.2 g/in$^3$, >1.5 g/in$^3$, 1.7 g/in$^3$ or >2.00 g/in$^3$ or for example 1.5 to 2.5 g/in$^3$.

Alternatively, the tungsten/titania support is kneaded along with other components such as fillers, binders, and reinforcing agents, into an extrudable paste which is then extruded through a die to form a honeycomb brick. Before or after the honeycomb brick is dried and/or calcined, the noble metal component is added to either one or more portions of the brick or to the entire brick in order to form the oxidation catalyst. In other embodiments, the oxidation catalyst containing the noble metal on the tungsten/titania support is incorporated into the extrudable paste prior to extrusion.

Two substrate designs useful in the present invention are plate and honeycomb. Plate-type catalysts have relative lower pressure drops and are less susceptible to plugging and fouling than the honeycomb types, but plate configurations are much larger and more expensive. The plates are typically constructed of metal or corrugated metal.

Honeycomb configurations are more compact than plate types, but have higher pressure drops and plug more easily. However, for most mobile applications, preferred substrates include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow though monolith has a high cell density, for example about 600 to 800 cells per square inch, and/or an average internal wall thickness of about 0.18-0.35 mm, preferably about 0.20-0.25 mm. For certain other applications, the honeycomb flow through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite e.g. acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate. In certain embodiments, the substrate is preferably inert.

To reduce the amount of space required for an exhaust system, individual exhaust components in certain embodiments are designed to perform more than one function. For example, applying an ASC catalyst to a wall-flow filter substrate instead of a flow-through substrate serves to reduce the overall size of an exhaust treatment system by allowing one substrate to serve two functions, namely reducing ammonia slip by the catalyst and removal of exhaust gas soot by the filter substrate. Accordingly, in certain embodiments, the substrate is a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas that enters the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. In certain embodiments, the efficiency will be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face of a filter. Preferably, the porous substrate has a pore interconnectivity volume of at least about 30%, more preferably at least about 40%.

The mean pore size of the porous substrate is also important, particularly for filtration applications. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about 10 to about 25 µm, about 10 to about 20 µm, about 20 to about 25 µm, about 10 to about 15 µm, and about 15 to about 20 µm.

Turning to FIG. 1A, shown is an embodiment of the present invention wherein the oxidation catalyst is a washcoat layer (20) on the surface of a wall of a high-porosity flow-through substrate (10). Here, the layer covers only a portion of the substrate, namely a rear portion. However, in other embodiments, the layer can cover the entire substrate or a front portion of the substrate. The layer may be 25%, 50%, or 75% of the length of the substrate, either from the front or rear. As used herein, the "front" of the substrate is the inlet end relative to normal gas flow through the substrate and the "rear" is the outlet end relative to normal gas flow through the substrate. For a coating on a filter, the coating containing the oxidation catalyst may be on the upstream side of the filter walls, on the downstream side of the filter walls, or both, wherein "upstream" and "downstream" are defined relative to the normal direction of exhaust gas permeating through the filter wall. Preferably, the oxidation catalyst penetrates at least a portion of the substrate wall.

Figure 1B:
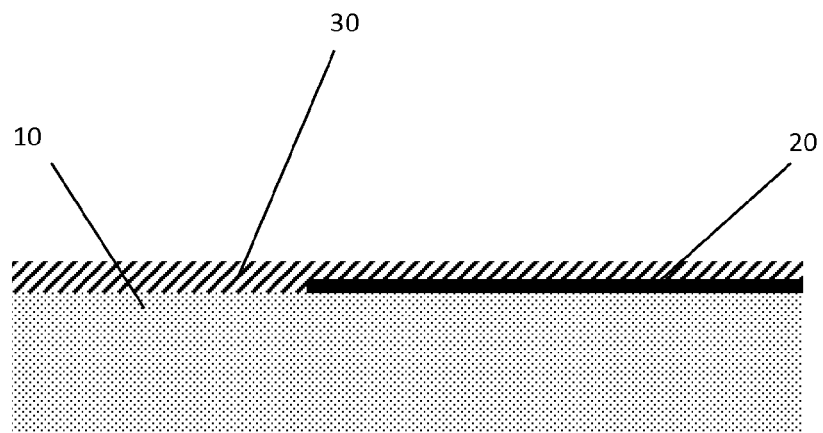

Turning to FIG. 1B, the catalyst article comprises a substrate (10), a first catalytic layer on the substrate (30), and a second catalytic layer on the substrate containing the W/$TiO_2$ supported noble metal catalyst (20). Here, the first layer is applied to the entire length of the substrate. In other embodiments, the first layer is applied to only a portion of the substrate. In certain embodiments, the first layer preferably covers the entire second layer.

As used herein the terms "first layer" and "second layer" are used to describe the relative positions of catalyst layers in the catalyst article with respect to the normal direction of exhaust gas flow through and/or over the catalyst article. Under normal exhaust gas flow conditions, exhaust gas contacts the first layer prior to contacting the second layer. In certain embodiments, the second layer is applied to an inert flow-through honeycomb substrate as a bottom layer and the first layer is top layer that is applied over the second layer. In such embodiments, the exhaust gas passing through the substrate penetrates (and hence contacts) the first layer, before contacting the second layer, and subsequently returns through the first layer to exit the catalyst component. In other embodiments, the first layer is a first zone disposed on an upstream portion of the substrate and the second layer is disposed on the substrate as a second zone, wherein the second zone is downstream of the first.

In certain embodiments, the first catalyst layer contains a catalyst for storing $NH_3$ and/or selectively reducing $NO_x$ with $NH_3$ in the presence of oxygen, also referred to herein as an SCR catalyst. As used herein, the term "catalyst" with respect to $NH_3$ storage, refers to a material that adsorbs $NH_3$ under certain conditions and releases the stored $NH_3$ under other conditions, but does not necessarily catalyze a reaction involving $NH_3$.

In certain embodiments, the SCR catalyst comprises at least one promoter metal on a high surface area support including refractory metal oxides and molecular sieves such as aluminosilicate (zeolites), silico-aluminophosphate (SAPOs), or aluminophosphate (AlPOs). In certain embodiments, the promoter metal is selected from the group consisting of V, Cr, Co, Cu, Fe, Hf, La, Ce, In, V, Mn, Ni, Zn, and Ga. The promoter metal can be a free metal or metal ion and can be incorporated on or within the support by various techniques including ion exchange, incipient wetness, direct coating, or in situ during the synthesis of the support material. Preferred promoter metals include Cu and Fe, particularly when the promoter metal is loaded on or within a molecular sieve.

In certain embodiments, the promoter metal oxide is vanadium such as free vanadium, vanadium ion, or an oxide of vanadium or a derivative thereof. Preferably, the form of vanadium is vanadia ($V_2O_5$). In addition to vanadium, the promoter metal oxide can include other catalytically active metal oxides such as oxides of tungsten and/or oxides of molybdenum. As used herein, a "catalytically active" metal oxide is one that directly participates as a molecular component in the catalytic reduction of $NO_x$ and/or oxidization of $NH_3$ or other nitrogenous-based SCR reductants. In certain embodiments, the SCR catalyst is $V_2O_5/WO_3/TiO_2$, and optionally includes $MoO_3$.

Preferred molecular sieve supports include zeolites and SAPOs having a framework selected from the group consisting of AEI, AFX, CHA, KFI, LEV, ERI, DDR, UEI, RHO, EAB, PAU, MER, GOO, YUG, GIS, UFI, VIN, AEI/CHA intergrowths, BEA, MFI, MOR, and FER. In certain embodiments, the framework is selected from AEI, CHA, and intergrowths thereof. Preferred aluminosilicate molecular sieves have a silica-to-alumina ratio of about 10 to about 50, preferably about 15 to about 25.

In other embodiments, the high surface area support of the SCR catalyst is a refractory metal oxide. Preferred refractory metal oxides include $Al_2O_3$, $TiO_2$, $CeO_2$, $SiO_2$, and $ZrO_2$. The refractory metal oxide support preferably has a pore volume of about 0.1-0.5 g/cc, for example about 0.2-0.4 g/cc, preferably measured by mercury intrusion porosimetry. In certain embodiments, the supports have wide pores (e.g., 100-350 Å) or both wide and narrow pores. In certain embodiments, the support has a BET surface area of at least 50 $m^2/g$, preferably about 50-500 $m^2/g$, more preferably about 50-300 $m^2/g$, or about 150-250 $m^2/g$.

Preferably, the catalyst layer containing SCR catalyst is substantially free of noble metals and the catalyst layer containing the oxidation catalyst is substantially free of the SCR catalyst components. By "substantially free" with respect to a catalyst layer means that the relevant metal is not present in the layer in an amount that would affect the performance of the catalyst layer. In certain embodiments, a layer that has a first metal and that is "substantially free" of a second metal means that the layer has less than 5 weight percent of the second metal, relative to the first metal, preferably less than 1 weight percent, and even more preferably less than 0.1 weight percent. In certain embodiments, the first and second layers are adjacent to, and in contact with, each other, but are physically separate layers.

Coatings on wall-flow filters are on the inlet and/or outlet side of the filter (relative to exhaust gas flow through the filter), preferably on the outlet side of the filter, particularly for embodiments that also incorporate a selective catalyst reduction (SCR) catalyst or soot oxidation catalyst on the upstream side of the filter.

In certain embodiments, the catalyst article of the present invention is part an emission gas treatment system wherein the catalyst article is disposed downstream of a source of a nitrogenous reductant. Examples of nitrogenous reductants include ammonia and ammonia hydrazine or any suitable ammonia precursor, such as urea (($NH_2$)$_2$CO), ammonium carbonate, ammonium carbamate, ammonium hydrogen carbonate or ammonium formate. More preferably, the catalyst article is an ammonia slip catalyst disposed downstream of a selective catalytic reduction (SCR) catalyst. In such embodiments, the ammonia slip catalyst oxidizes at least a portion of any nitrogenous reductant that is not consumed by the selective catalytic reduction process. For example, in certain embodiments, the ammonia slip catalyst is disposed on the outlet side of a wall flow filter and an SCR catalyst is disposed on the upstream side of a filter. In certain other embodiments, the ammonia slip catalyst is disposed on the downstream end of a flow-through substrate and an SCR catalyst is disposed on the upstream end of the flow-through substrate. In other embodiments, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, ammonia is oxidized at a temperature of at least 100° C. In another embodiment, the ammonia is oxidized at a temperature from about 150° C. to 750° C. In a particular embodiment, the temperature range is from 175 to 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

The method can be performed on an exhaust gas derived from a combustion process, such as from an internal combustion engine (whether mobile or stationary), a gas turbine for stationary, marine, or locomotive applications, and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a gas turbine or a lean-burn engine.

The present catalyst is suitable to treat an exhaust gas containing high amounts of $SO_x$. For example, the catalyst can be exposed to high concentrations of sulfur before requiring regeneration. More infrequent regeneration leads to better fuel economy because fewer fuel injection-based regeneration events are required. In certain embodiments, the invention is directed to a method for regenerating a catalytic article used to treat exhaust gas comprising the steps of (a) flowing an exhaust gas containing $SO_x$ through a substrate having an oxidation catalyst coating as described herein, (b) adsorbing at least a portion of the $SO_x$ on the catalyst coating, and (c) regenerating the catalyst after the catalyst layer adsorbs at least about 5 g/L of the $SO_x$, at least about 10 g/L, or at least about 20 g/L, for example about 5 to about 50 g/L, including about 5 to about 10 g/L, about 10 to about 20 g/L, about 20 to about 30 g/L, about 30 to about 40 g/L and about 40 to about 50 g/L.

The concentration of $SO_x$ in the exhaust gas is not particularly limited. That is, an exhaust gas having a high $SO_x$ concentration will lead to more frequent regenerations compared to an exhaust gas having low $SO_x$ concentration. Yet even when the catalyst is used to treat exhaust gas having low $SO_x$ concentration, the interval between regeneration times can still be extended compared to conventional catalysts. In certain application, the catalyst is used to treat exhaust gas generated by combusting fuel, such as diesel fuel, containing more than 300 ppm sulfur, more than 500 ppm sulfur, more than 1000 ppm sulfur, or more than 2000 ppm sulfur.

In addition to diesel exhaust, the oxidation catalyst of the present invention can treat other types of exhaust gases that might contain high sulfur concentrations, such as flue gases from coal-fired power plants, or turbines fueled by natural gas. In such embodiments, the oxidation catalyst of the present invention can oxidize other components of the exhaust gas in addition to $NH_3$.

After becoming sulfated, the present catalyst can withstand high regeneration temperatures. For example, regeneration can occur at temperatures above 350° C., such as above 450° C., and about 550° C. However, the present catalyst can also be successfully regenerated at relatively low temperatures, such as at 400° C. or below, and even at 350° C. or below. Accordingly, the catalyst, as well as other components in the after-treatment system, particularly other catalysts on the same substrate, is subjected to less thermal stress during routine operation. Lower regeneration temperatures also require less fuel for heating, thus improving fuel economy.

The present catalyst also has superior performance after high temperature aging. For example, the performance of the catalyst is maintained after hydrothermal aging at temperatures of 580° C. for 100 hours.

In a further embodiment, an oxidation catalyst for oxidizing nitrogen monoxide in the exhaust gas to nitrogen dioxide can be located upstream of where the nitrogenous reductant is added into the exhaust gas. In one embodiment, the oxidation catalyst is adapted to yield a gas stream entering the SCR catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the ammonia slip catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the ammonia slip catalyst. Alternatively, if the filter is uncatalyzed, the means for metering nitrogenous reductant can be located between the oxidation catalyst and the filter.

EXAMPLES

Example 1: Catalyst Preparation

A catalyst washcoat comprising platinum on a $WO_3/TiO_2$ support having 5 weight % $WO_3$ and the balance $TiO_2$ was applied to the walls of a 1-inch×1-inch flow-through ceramic honeycomb substrate. The coated substrate was aged for 100 hours at 580° C. and 10% moisture. The integrity of the sample was maintained.

Example 2 and Comparative Examples A-E: $NH_3$ Conversion after Heavy Sulfur Loading The coated substrate from Example 1 was sulfated under the following conditions: 200 ppm sulfur for 128 minutes at 300° C. The sulfated sample was then loaded into a SCAT rig to test the sample's ability to oxidize $NH_3$ in a simulated exhaust gas containing 500 ppm NH3, 4.5 wt. % CO, 5 wt. % H2O, 200 ppm CO2, 12 wt. % O2, and the balance N2. The test was conducted at 225° C. and an exhaust gas space velocity of 150,000 $hr^{-1}$. The catalyst performance was evaluated under sulfated conditions, and also after 15 minute regenerations at 350° C., 400° C., 450° C., 500° C., and 550° C.

Comparative samples A-E were prepared using the procedure described in Example 1, but with the supports specified in Table 1:

TABLE 1

| Comparative Example | Support Formulation |
| --- | --- |
| A | γ-alumina |
| B | 12% $SiO_2/TiO_2$ |
| C | $SiO_2$ |
| D | $TiO_2$ |
| E | $TiO_2/SiO_2/WO_3$ |

Figure 2:
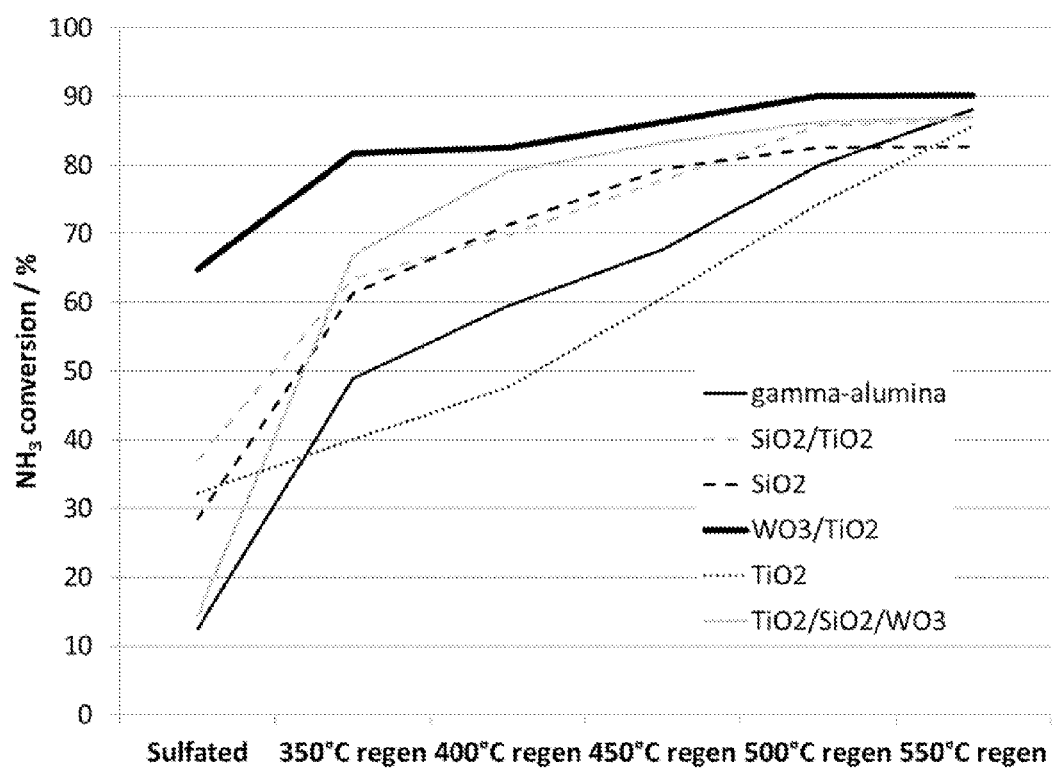
FIG. 2 is a graph depicting $NH_3$ conversion of sulfated catalysts after regenerations at different temperatures.

These comparative samples were then subjected to similar sulfation and evaluated for $NH_3$ oxidation performance under similar conditions. The results of these tests are provided in FIG. 2.

The results of these test show that a PGM supported on a $WO_3/TiO_2$ had better $NH_3$ conversion performance after sulfation compared to other supports including $TiO_2$, and $TiO_2/SiO_2/WO_3$.

What is claimed is:

1. A method for regenerating a catalytic article used to treat exhaust gas comprising:
   a. flowing an exhaust gas through a substrate having an oxidation catalyst, wherein the exhaust gas contains $SO_x$ prior to entering the substrate, and wherein the oxidation catalyst comprises a noble metal on a $WO_3$—$TiO_2$ composite oxide support, wherein the support contains about 1 to about 20 weight percent $WO_3$ based on the combined weight of the $WO_3$ and $TiO_2$;
   b. absorbing at least a portion of the $SO_x$ in the catalyst layer; and
   c. regenerating the catalyst after the catalyst layer adsorbs at least 5 g/L of the $SO_x$.

2. A method for regenerating a catalytic article used to treat exhaust gas comprising:
   a. flowing an exhaust gas through a substrate having an oxidation catalyst, wherein the exhaust gas contains $SO_x$ prior to entering the substrate, and wherein the oxidation catalyst comprises a noble metal on a $WO_3$—$TiO_2$ composite oxide support, wherein the support contains about 1 to about 20 weight percent $WO_3$ based on the combined weight of the $WO_3$ and $TiO_2$;
   b. absorbing at least a portion of the $SO_x$ in the catalyst layer; and
   c. regenerating the catalyst at a temperature of not greater than 350° C.

3. The method of claim 1, wherein the support contains about 2 to about 10 weight percent $WO_3$ based on the combined weight of the $WO_3$ and $TiO_2$.

4. The method of claim 1, wherein the oxidation catalyst is essentially free of V, Ce, Zr, Al, Si, and Mo.

5. The method of claim 1, wherein the noble metal is Au, Ag, Pt, Pd, Rh, or combination thereof.

6. The method of claim 1, wherein the noble metal is Pt, Pd, or a combination thereof.

7. The method of claim 1, wherein the substrate further comprises a washcoat, wherein the washcoat contains the oxidation catalyst.

8. The method of claim 1, wherein the substrate further comprises a second catalyst for selectively reducing $NO_x$ in the presence of oxygen and/or for storing $NH_3$, wherein the second catalyst is disposed on or within substrate, but is physically separate from the oxidation catalyst.

9. The method of claim 8, wherein the oxidation catalyst is disposed on the substrate as a first washcoat layer and the second catalyst is disposed on the substrate as a second washcoat layer, wherein the first washcoat layer completely covers, but is separate from, the second layer.

10. The method of claim 9, wherein the second catalyst layer comprises a high surface area metal oxide selected from the group consisting of $Al_2O_3$, $TiO_2$, $CeO_2$, $SiO_2$, and $ZrO_2$, or an aluminosilicate or silicoaluminophosphate molecular sieve, wherein the metal oxide or molecular sieve optionally supports a promoter metal selected from the group consisting of V, Cr, Co, Cu, Fe, Hf, La, Ce, In, V, Mn, Ni, Zn, and Ga.

11. The method of claim 10, wherein the second catalyst layer comprises a promoter metal selected from Cu and Fe supported on a molecular sieve having a framework selected from the group consisting of AEI, AFX, CHA, KFI, LEV, ERI, DDR, UEI, RHO, EAB, PAU, MER, GOO, YUG, GIS, UFI, VIN, AEI/CHA intergrowths, BEA, MOR, and FER.

12. The method of claim 2, wherein the support contains about 2 to about 10 weight percent $WO_3$ based on the combined weight of the $WO_3$ and $TiO_2$.

13. The method of claim 2, wherein the oxidation catalyst is essentially free of V, Ce, Zr, Al, Si, and Mo.

14. The method of claim 2, wherein the noble metal is Au, Ag, Pt, Pd, Rh, or combination thereof.

15. The method of claim 2, wherein the noble metal is Pt, Pd, or a combination thereof.

16. The method of claim 2, wherein the substrate further comprises a washcoat, wherein the washcoat contains the oxidation catalyst.

17. The method of claim 2, wherein the substrate further comprises a second catalyst for selectively reducing $NO_x$ in the presence of oxygen and/or for storing $NH_3$, wherein the second catalyst is disposed on or within substrate, but is physically separate from the oxidation catalyst.

18. The method of claim 17, wherein the oxidation catalyst is disposed on the substrate as a first washcoat layer and the second catalyst is disposed on the substrate as a second washcoat layer, wherein the first washcoat layer completely covers, but is separate from, the second layer.

19. The method of claim 18, wherein the second catalyst layer comprises a high surface area metal oxide selected from the group consisting of $Al_2O_3$, $TiO_2$, $CeO_2$, $SiO_2$, and $ZrO_2$, or an aluminosilicate or silicoaluminophosphate molecular sieve, wherein the metal oxide or molecular sieve optionally supports a promoter metal selected from the group consisting of V, Cr, Co, Cu, Fe, Hf, La, Ce, In, V, Mn, Ni, Zn, and Ga.

20. The method of claim 19, wherein the second catalyst layer comprises a promoter metal selected from Cu and Fe supported on a molecular sieve having a framework selected from the group consisting of AEI, AFX, CHA, KFI, LEV, ERI, DDR, UEI, RHO, EAB, PAU, MER, GOO, YUG, GIS, UFI, VIN, AEI/CHA intergrowths, BEA, MOR, and FER.

* * * * *